United States Patent
Chen et al.

[19]

[11] Patent Number: 5,852,638
[45] Date of Patent: Dec. 22, 1998

[54] METHOD AND APPARATUS FOR DEMODULATING A SYMBOL USING SYMBOL FRAGMENTATION, CORRELATION AND FOURIER ANALYSIS

[75] Inventors: Weizhong Chen, Keller; Slim Souissi, Fort Worth, both of Tex.

[73] Assignee: Motorola, Inc., Schaumburg, Ill.

[21] Appl. No.: 858,337

[22] Filed: May 19, 1997

[51] Int. Cl.$^6$ .......................... H04L 27/38; H04L 27/22; H04L 27/144

[52] U.S. Cl. ........................ 375/344; 375/329; 375/335; 375/340; 375/343; 329/300; 329/304

[58] Field of Search ..................... 375/261, 271, 375/272, 275, 279, 316, 322, 324, 326, 329, 334, 335, 340, 343, 344; 455/205, 208, 214, 255, 257, 258, 263, 266, 334, 337; 329/300, 302, 304, 306

[56] References Cited

U.S. PATENT DOCUMENTS 5,119,322  6/1992  Stroobach ........................ 364/724.09
5,272,446  12/1993  Chalmers et al. ...................... 329/304

*Primary Examiner*—Stephen Chin
*Assistant Examiner*—Jeffrey W. Gluck
*Attorney, Agent, or Firm*—R. Louis Breeden

[57] ABSTRACT

A method and apparatus receives a symbol and subdivides (720) the symbol into a plurality of fragments. The method and apparatus perform (704) for the plurality of fragments a plurality of correlations with at least one possible symbol value, thereby producing a plurality of complex values corresponding to each fragment and further corresponding to the at least one possible symbol value. From the plurality of complex values a plurality of overall Fourier transforms are computed (706) across a frequency range, and a peak value in the plurality of overall Fourier transforms is located (708). The symbol is then determined (710) from the peak value.

21 Claims, 7 Drawing Sheets

5,852,638

METHOD AND APPARATUS FOR DEMODULATING A SYMBOL USING SYMBOL FRAGMENTATION, CORRELATION AND FOURIER ANALYSIS

FIELD OF THE INVENTION

This invention relates in general to radio communication systems, and more specifically to a method and apparatus for demodulating a symbol.

BACKGROUND OF THE INVENTION

Some radio communication applications, e.g., inbound channel transmissions in an acknowledge-back paging, require low power transmitters to conserve battery power in the portable subscriber units. One way of achieving low power while maintaining an adequate transmission range is to use a highly sensitive receiver for receiving and demodulating the low power transmissions. High sensitivity has been achieved for data rates of 1600 and 800 bits per second (bps) in prior art frequency shift keying (FSK) systems by using a frequency domain demodulator employing, for example, fast Fourier transform (FFT) techniques, for demodulating the data symbols.

To achieve even higher sensitivity, the data rate needs to be reduced even further to a very low data rate, such as 200 bps. Conventional FFT demodulators, however, do not perform well at such low data rates, because the energy peak at each symbol frequency becomes so narrow that small frequency errors inherent in the received signal can seriously reduce receiver sensitivity.

Thus, what is needed is a method and apparatus for demodulating a symbol transmitted at low power and at a very low data rate. Preferably, the method and apparatus should maintain receiver sensitivity at or near the theoretical benchmark sensitivity even in the presence of significant symbol frequency error.

SUMMARY OF THE INVENTION

An aspect of the present invention is a method in a receiver for demodulating a symbol. The method comprises the steps of receiving the symbol, and subdividing the symbol into a plurality of fragments. The method further comprises the step of performing for the plurality of fragments a plurality of correlations with at least one possible symbol value, thereby producing a plurality of complex values corresponding to each fragment and further corresponding to the at least one possible symbol value. The method further comprises the steps of computing from the plurality of complex values a plurality of overall Fourier transforms across a frequency range, and locating a peak value in the plurality of overall Fourier transforms. In addition, the method includes the step of determining the symbol from the peak value.

Another aspect of the present invention is an apparatus in a receiver for demodulating a symbol received by the receiver. The apparatus comprises a signal processor for demodulating the symbol. The signal processor is programmed to subdivide the symbol into a plurality of fragments, and to perform for the plurality of fragments a plurality of correlations with at least one possible symbol value, thereby producing a plurality of complex values corresponding to each fragment and further corresponding to the at least one possible symbol value. The signal processor is further programmed to compute from the plurality of complex values a plurality of overall Fourier transforms across a frequency range, and to locate a peak value in the plurality of overall Fourier transforms. The signal processor is also programmed to determine the symbol from the peak value.

Another aspect of the present invention is a receiver for demodulating a symbol. The receiver comprises a receiver element for receiving the symbol, and a signal processor for demodulating the symbol. The signal processor is programmed to subdivide the symbol into a plurality of fragments, and to perform for the plurality of fragments a plurality of correlations with at least one possible symbol value, thereby producing a plurality of complex values corresponding to each fragment and further corresponding to the at least one possible symbol value. The signal processor is further programmed to compute from the plurality of complex values a plurality of overall Fourier transforms across a frequency range, and to locate a peak value in the plurality of overall Fourier transforms. The signal processor is also programmed to determine the symbol from the peak value.

DETAILED DESCRIPTION OF THE DRAWINGS

Figure 1:
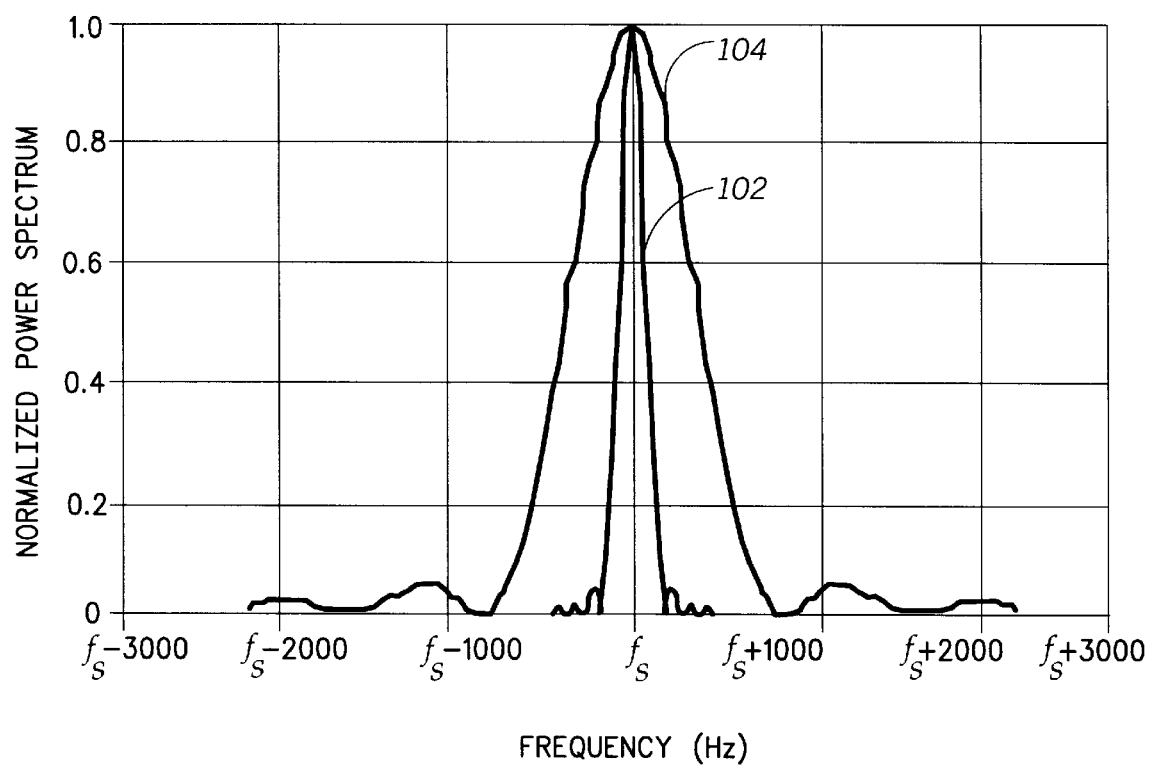
FIG. 1 is a frequency domain power spectrum diagram comparing two symbol rates.

A 200 bps channel using 4-level FSK modulation with deviations at ±800 Hz and ±2400 Hz has all its symbols orthogonal. At 200 bps, however, prior art FFT demodulation methods become unstable, and cannot be directly applied. Referring to FIG. 1, a frequency domain power spectrum diagram comparing two symbol rates depicts, by way of example, a power spectrum peak 102 corresponding to a 200 bps symbol and a power spectrum peak 104 corresponding to a 1600 bps symbol. As the symbol period increases, the symbol in the frequency domain becomes narrower as shown in FIG. 1. In the prior art FFT receiver, ideally the symbol's energy is calculated on the symbol frequency $f_s$, which are the peak values shown in FIG. 1. In actual implementation, this symbol frequency cannot be accurately determined, and the symbol energy is estimated at a frequency $f_s+f_e$, where $f_e$ is the frequency error. It is easy to see that for a given frequency error $f_e$, the 200 bps symbol energy is more difficult to measure than the 1600 bps symbol energy. In other words, a lower channel speed symbol is more difficult to detect when using the prior art techniques.

Significant sensitivity loss occurs at 200 bps due to the frequency error. The frequency error $f_e$ comes from the following three independent sources: i) frequency acquisition error (e.g., ±30 Hz) due to resolution limitation, ii) frequency acquisition error due to Doppler shift (e.g., ±60 Hz at 55 mph) resulting, for example, from a portable subscriber unit's movement, and iii) symbol frequency uncertainty (e.g., ±100 Hz) due to the frequency synthesizer inaccuracy in the portable subscriber unit. Thus, the total frequency error even after frequency acquisition can be large, e.g., ±190 Hz. FIG. 1 shows that when frequency error exceeds about 100 Hz, the FFT receiver will not work at all at the 200 bps transmission rate.

Figure 2:
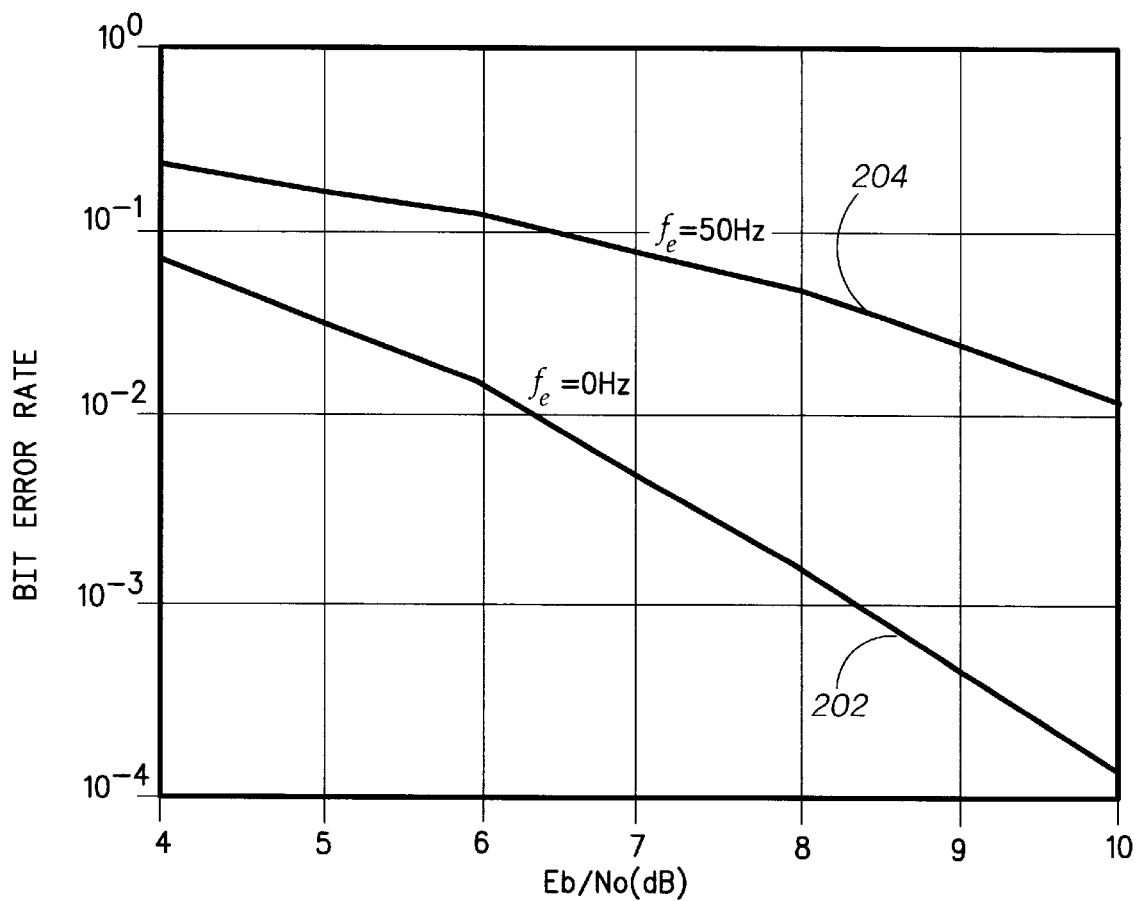
FIG. 2 is a performance chart for a prior art frequency domain receiver operating at a data rate of 200 bps.

Referring to FIG. 2, a performance chart for a prior art FFT receiver operating at a data rate of 200 bps depicts a first performance curve 202 with no frequency error and a second performance curve 204 with 50 Hz frequency error. Note that with 50 Hz frequency error there is about a 4 dB sensitivity loss. Thus, the prior art FFT receiver cannot be successfully applied to 200 bps channel symbol recovery.

Figure 3:
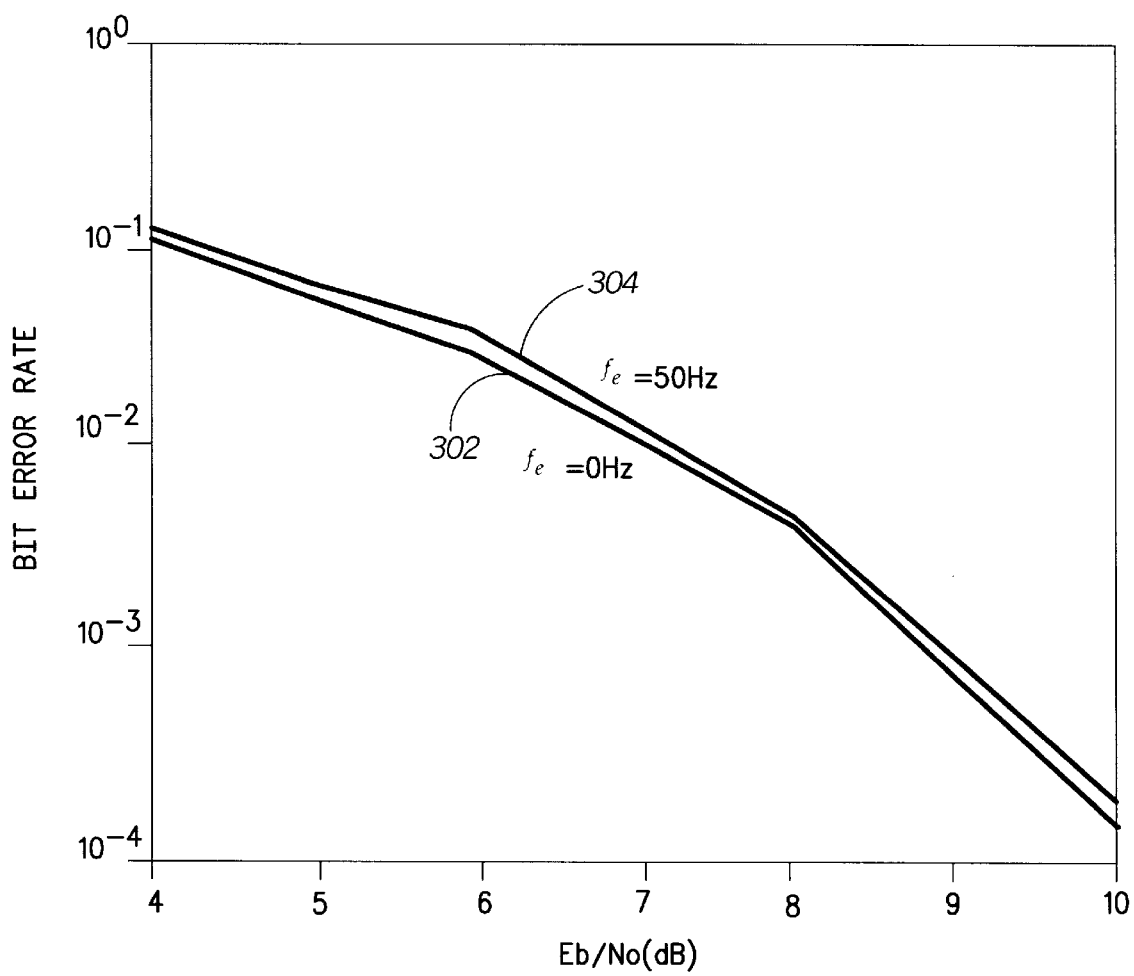
FIG. 3 is a performance chart for a frequency domain receiver in accordance with the present invention operating at 200 bps.

Referring to FIG. 3, a performance chart for a frequency domain receiver (described herein below) in accordance with the present invention operating at 200 bps depicts a first performance curve 302 with no frequency error and a second performance curve 304 with 50 Hz frequency error. Note that the sensitivity loss at 50 Hz is only a fraction of a dB, demonstrating a great improvement over the prior art FFT receiver.

Figure 4:
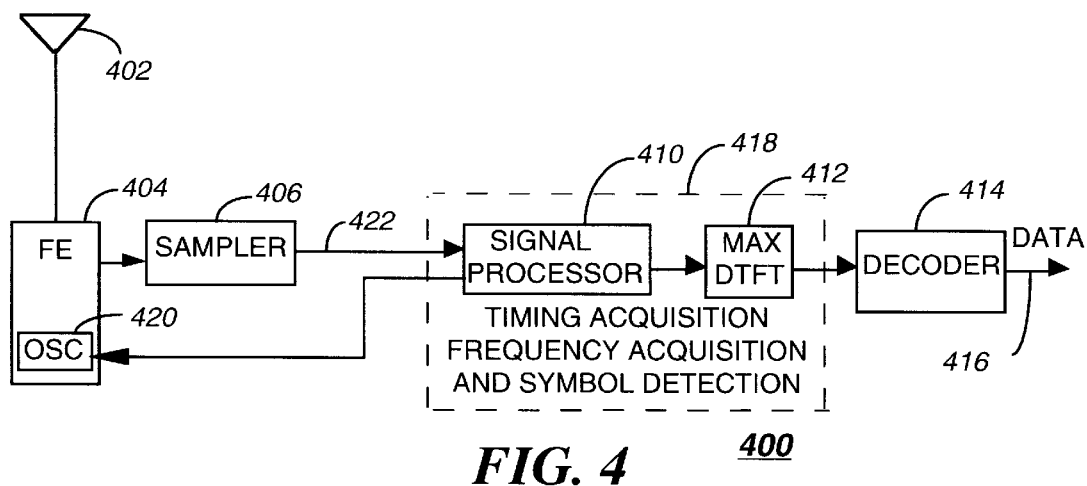
FIG. 4 is an electrical block diagram of the frequency domain receiver in accordance with the present invention.

Referring to FIG. 4, an electrical block diagram depicts the frequency domain receiver 400 in accordance with the present invention. The frequency domain receiver 400 comprises an antenna 402 for intercepting a radio signal. The antenna 402 is coupled to a conventional receiver front end 404 where a message from a low power transmitter (not shown) is amplified, filtered, and mixed to a low frequency baseband signal, at the output of the receiver front end 404, such as depicted in exemplary form in FIG. 5, all in accordance with approaches readily evident to one of ordinary skill in the art. The receiver front end 404 comprises an oscillator or frequency generator 420 for use in down-converting the radio signal.

Figure 5:
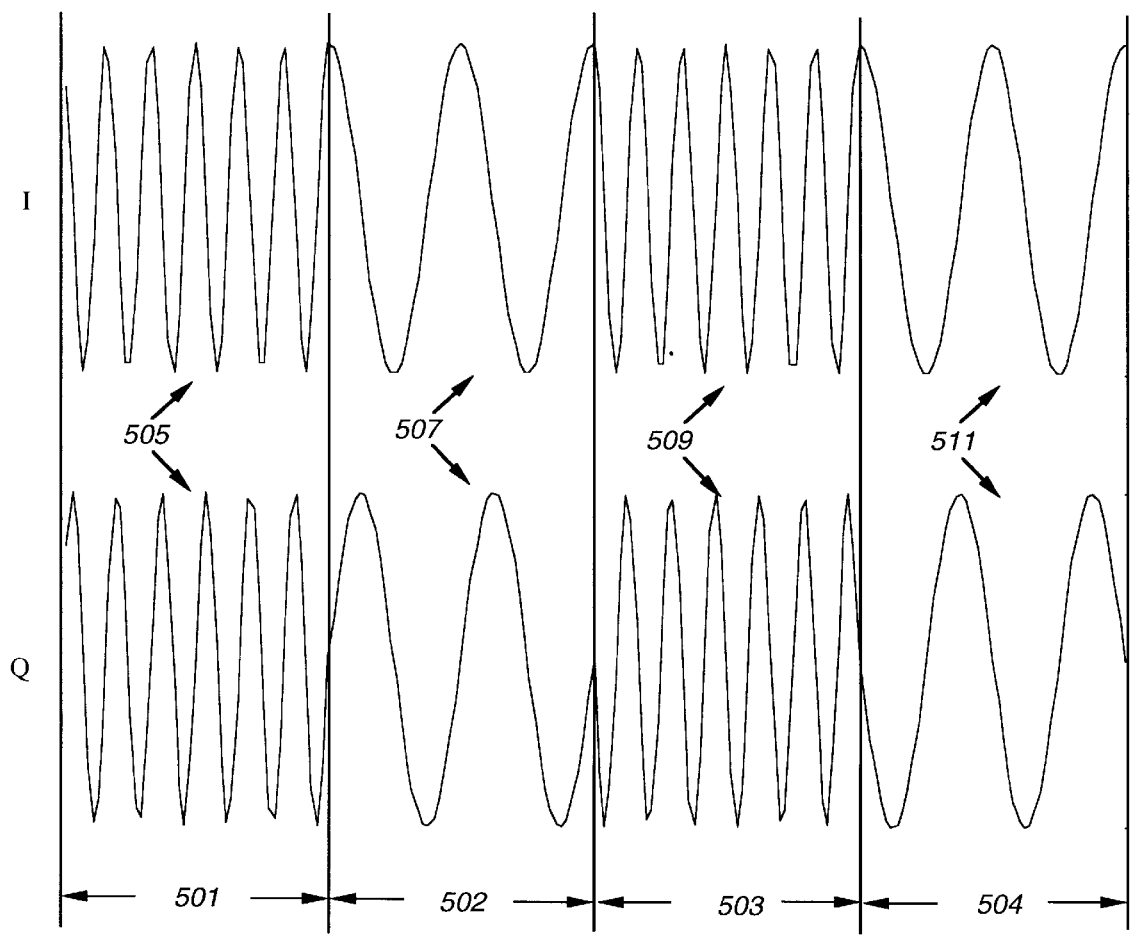
FIG. 5 is an exemplary signal diagram of an FSK baseband signal suited to understanding certain functions occurring in the frequency domain receiver in accordance with the present invention.

The FIG. 5 signal depicts a baseband signal 500, including in-phase (I) and quadrature (Q) components, that was FSK modulated with varying frequency signals representative of the four possible symbols, specifically ±2400 Hz and ±800 Hz, in the preferred system. Four symbol time periods 501, 502, 503, 504 are shown with time period 501 occupied by a first signal having a first frequency 505, preferably +2400 Hz, representative of a first symbol. Similarly time period 502 is occupied by a second signal having a second frequency 507, preferably +800 Hz, representative of a second symbol. During symbol time period 503 the first frequency repeats but with the opposite sign or phase for the quadrature component yielding a negative frequency signal, that is preferably −2400 Hz and during symbol time 504 the second frequency similarly repeats with an opposite phase or preferably −800 Hz. Each symbol time period depicted in FIG. 5 in the preferred embodiment is 10 milliseconds (ms) in duration. This symbol time duration corresponds to a 100 symbol per second rate and a 200 bit per second (bps) rate, as the preferred system encodes 2 bits per symbol.

The output of the receiver front end 404 with the baseband signal 500 is coupled to a sampler 406 where the baseband signal, both the in-phase (I) or real, and quadrature (Q) or imaginary components are sampled or converted to a digital signal at a sampling rate of 20,000 times per second. Each sample of the I and Q component is converted by an analog to digital converter (not specifically shown) to a 16 bit digital word. At this sampling rate 200 samples are taken during each symbol time period shown in FIG. 5, thus 200 digital words are generated in the preferred 200 bps embodiment. The digital words, as sampled digital data $x_i(n)$, $x_q(n)$, are coupled by the output 422 of the sampler 406 to a frequency acquisition, timing acquisition, and symbol detection (FATASD) block 418, the output of which is coupled to a decoder 414 for producing a decoded data message at an output 416. The FATASD block 418 comprises a signal processor 410 for acquiring the transmission frequency, acquiring the symbol timing, and computing preferably four discrete time Fourier transforms (DTFTs) on the samples of each symbol at the four symbol frequencies, as is described further herein below in accordance with the present invention. The FATASD block 418 further comprises a maximum DTFT block 412 that operates preferably as a comparator, as well understood, to select the largest magnitude DTFT from among the four DTFTs provided by the signal processor 410. The maximum DTFT block 412 provides a series of symbols, one for each symbol time period, or digital representations thereof to the decoder 414. It will be appreciated that, alternatively, the functions of the maximum DTFT block 412 can be performed by the signal processor 410 instead. The decoder 414 then decodes the symbols in accordance with whatever over the air protocol is used, as is well understood in the art, into a data or binary stream at the output 416. As the details of the over the air protocol and decoding are well understood in general and not further relevant to this disclosure no further space will be devoted to them. The signal processor 410 is also coupled to the oscillator 420 for controlling the frequency generated thereby.

The signal processor 410 is particularly useful when the sequence of samples comprises complex samples and the DTFT signal is a complex value. The signal processor or any or all of the requisite elements, such as the recursive structure and the combiner are preferably implemented in a digital signal processor executing software readily written by one of ordinary skill in the art, given the teachings of the instant disclosure. Alternatively, the signal processor may be implemented all or in part as one or more integrated circuits. In particular the preferred embodiment uses a Motorola DSP56166 DSP. This DSP is a 16 bit, fixed point processor. The preferred signal processing technique for calculating the DTFT has numerous advantages over other techniques, such as the so called Goertzel method, including a factor of 2 to 4 times fewer processing steps to provide a DTFT at an arbitrary frequency, and further produces minimal dynamic range requirements for intermediate steps. Additionally there is near zero processing latency. When the first signal sample is available processing may begin and as the last signal sample arrives the DTFT is shortly available. These factors together allow the utilization of minimal capability processors or minimal capability of any processor to do, for example, the historically complex task of symbol detection.

Figure 6:
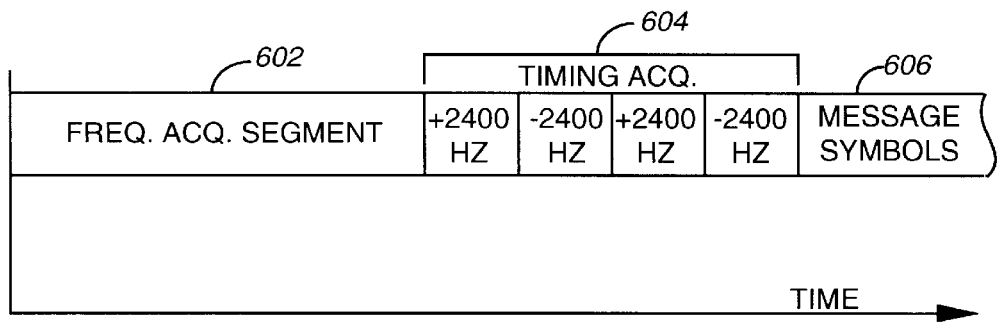
FIG. 6 is a protocol timing diagram depicting the beginning portions of a transmission in accordance with the present invention.

Before calculating the four DTFTs, the signal processor preferably acquires the transmission frequency and the symbol timing. Referring to FIG. 6, a protocol timing diagram 600 depicts the beginning portions of a transmission in accordance with the present invention. To aid the frequency acquisition process, the transmitted signal preferably includes a frequency acquisition segment 602. Following the frequency acquisition segment 602 is a timing acquisition segment 604 comprising preferably four alternating symbols of +2400 Hz, −2400 Hz, +2400, and −2400 Hz deviation. The timing acquisition segment 604 is utilized by the signal processor 410 to acquire the symbol timing as described herein further below. The timing acquisition segment 604 is followed by message symbols 606, which are demodulated in accordance with the present invention after frequency and timing acquisition have occurred.

The frequency acquisition segment 602 is a single tone signal, e.g., carrier frequency. The purpose of frequency acquisition is to estimate the frequency of the single tone signal. For 200 bps and two bits per symbol, a symbol period $T_s = \frac{1}{100}$ sec. To achieve the desired sensitivity the frequency acquisition segment preferably has a duration of five symbols, equal to a duration of $T_f = \frac{1}{20}$ second. Because the long duration produces a frequency domain energy peak that is very narrow, to estimate the tone frequency of the frequency acquisition segment using prior art techniques would require a frequency sampling interval less than 10 Hz. The defined frequency error range for the preferred embodiment is ±1260 Hz, where ±1000 Hz is due to transmitter local oscillator uncertainty, ±100 Hz is due to receiver local oscillator uncertainty, ±100 Hz is due to symbol frequency uncertainty, and an additional ±60 Hz is due to Doppler shift. Therefore the prior art frequency acquisition method would require the calculation of DTFTs on 2520/30+1 =85 frequency points. The frequency acquisition segment has 1000 points of data at a 20 KHz sampling rate. Such calculations would impose an unrealistic requirement of processing power for currently available hardware.

Secondly, even if the processing power were readily available to calculate the Fourier transform, the scaling factor of $\frac{1}{1000}$ required for the 1000-point Fourier transform would cause significant sensitivity loss. This is because the incoming data must be multiplied by $\frac{1}{1000}$ before the Fourier transform calculation in order to avoid overflow on a fixed point DSP chip. The multiplication by $\frac{1}{1000}$ is a 10 bit right-shifting of the incoming data in a total of 16 bit memory, resulting in a maximum of only 5 bits for information plus noise.

Frequency acquisition is the first step of the message recovery. If frequency acquisition fails, no matter how sophisticated the timing and symbol recovery are, the whole packet fails. Therefore the frequency acquisition should be designed to be very robust. For practical applications the frequency acquisition should also require a reasonable processing power. The preferred frequency acquisition technique described herein below satisfies all these criteria.

First, the FATASD block 418 subdivides the frequency acquisition segment into a plurality of, e.g., four, portions. Each portion then has a duration of $\frac{1}{80}$ second, which is equivalent to a symbol at 800 bps. Next, the FATASD block 418 calculates a Pourier power spectrum for each portion over the frequency range of ±660 Hz at a frequency sampling interval of 30 Hz. Preferably, for calculating the Fourier power spectra the FATASD block 418 utilizes the recursive DTFT calculation technique described herein below. Then the FATASD block 418 calculates the sum of the Fourier power spectra over all the plurality of portions and locates the peak of the summed Fourier power spectra. The frequency corresponding to the peak is the carrier frequency error. It will be appreciated that, alternatively, different subdivisions, durations, frequency ranges, and frequency sampling intervals can be utilized without departing from the scope and intent of the present invention.

Because of the smaller Fourier transform required after subdividing the frequency acquisition segment, the dense frequency sampling (10 Hz sampling interval) and intense computation are avoided. In addition, the smaller Fourier transform allows a smaller scaling factor to be used, which effectively increases the sensitivity.

Simulation results show excellent performance as compared with other alternatives. It has been determined that with the above frequency acquisition method, only 1 or 2 packets are missed in 1000 packets at a 4 dB Eb/No ratio. If the direct method (big Fourier transform method) is used with the same sampling interval (30 Hz), about 20 percent of the packets are missed. In a fading environment (55 mph), the frequency acquisition method in accordance with the present invention still exhibits excellent behavior, missing 20 out of 1000 packets at a 4 dB Eb/No ratio.

Once the transmission frequency has been acquired, the FATASD block 418 preferably acquires the symbol timing. This process is aided by a timing synchronization pattern that is transmitted following the frequency acquisition segment. The timing synchronization pattern preferably comprises four symbols arranged in a pattern corresponding to +2400 Hz, −2400 Hz, +2400 Hz, and −2400 Hz. Briefly, the FATASD block 418 calculates a cross-correlation between the known timing acquisition pattern a(n) and the received signal x(n) whose carrier error has been corrected. Preferably, the cross-correlation is calculated using a fast, recursive technique, as described herein further below. Then the FATASD block 418 locates the peak of the cross-correlation, which corresponds to the timing error.

U.S. patent application Ser. No. 08/858,257 by Weizhong Chen, entitled "Apparatus and Method for Signal Timing Error Detection," filed concurrently herewith, is hereby incorporated herein by reference. Said patent application discloses a timing acquisition method and apparatus that is the preferred technique for timing acquisition for the invention claimed in the instant application. It will be appreciated that, alternatively, other, well-known techniques for timing acquisition can be utilized as well to recover the timing.

Having acquired both the transmission frequency and the symbol timing, the FATASD block 418 is then ready to begin decoding the symbols of the message. For the reasons discussed herein above, the 200 bps symbols are too narrow in the frequency domain to use conventional FFT receiver techniques for decoding the symbols. A novel decoding technique has thus been developed, as described below.

Figure 7:
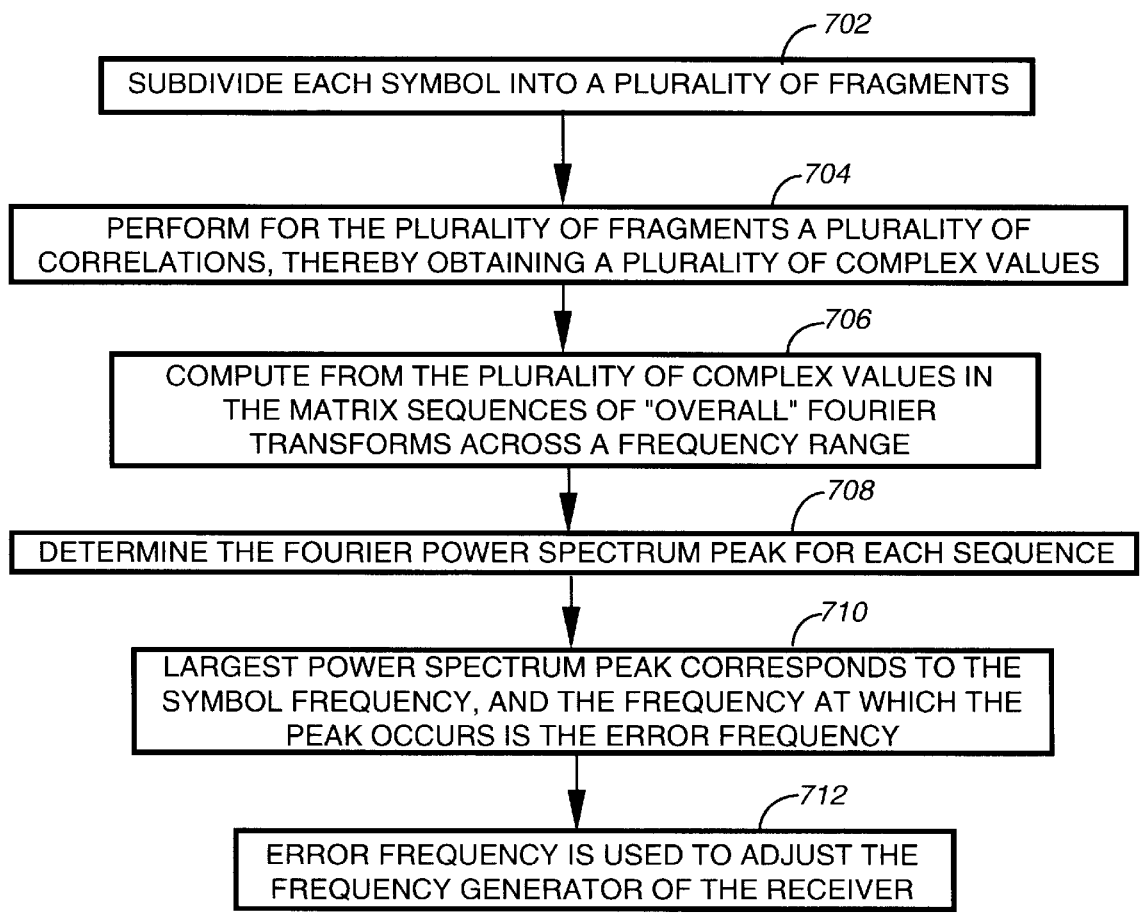
FIG. 7 is a flow chart depicting a symbol recovery technique in accordance with the present invention.

Referring to FIG. 7, a flow chart depicts the symbol recovery technique in accordance with the present invention. By way of example, a preferred embodiment is described for a system employing four-level FSK modulation at 200 bps. First, the FATASD block 418 subdivides 702 each 200 bps symbol into a plurality of, e.g., eight, fragments preferably of equal length $x_1(n), x_2(n), \ldots x_8(n)$. Each fragment thus becomes a 1600 bps symbol, and the four-level FSK symbols (preferably ±800 Hz and ±2400 Hz tones) represented by each fragment remain orthogonal.

Next, the FATASD block 418 performs 704 for the plurality of fragments a plurality of correlations with the four possible symbol values, thereby producing a plurality of complex values corresponding to each fragment and further corresponding to the four possible symbol values. For the FSK case, the correlations preferably are performed by calculating discrete time Fourier transforms (DTFTs) for $x_1(n), x_2(n), \ldots x_8(n)$ on the four symbol frequencies $f_1 = -2400$ Hz, $f_2 = -800$ Hz, $f_3 = 800$ Hz, $f_4 = 2400$ Hz, resulting in the following matrix $X_1(f_1)$ $X_2(f_1)$ $X_3(f_1)$ $X_4(f_1)$ $X_5(f_1)$ $X_6(f_1)$ $X_7(f_1)$ $X_8(f_1)$ $X_1(f_2)$ $X_2(f_2)$ $X_3(f_2)$ $X_4(f_2)$ $X_5(f_2)$ $X_6(f_2)$ $X_7(f_2)$ $X_8(f_2)$ $X_1(f_3)$ $X_2(f_3)$ $X_3(f_3)$ $X_4(f_3)$ $X_5(f_3)$ $X_6(f_3)$ $X_7(f_3)$ $X_8(f_3)$ $X_1(f_4)$ $X_2(f_4)$ $X_3(f_4)$ $X_4(f_4)$ $X_5(f_4)$ $X_6(f_4)$ $X_7(f_4)$ $X_8(f_4)$ Next, the FATASD block 418 computes 706 from the plurality of complex values in the matrix four sequences of "overall" Fourier transforms across a frequency range. More specifically, the FATASD block 418 computes the four sequences of overall Fourier transforms using the eight complex values of each row of the matrix as samples (corresponding to each of the four symbol frequencies). The four sequences of overall Fourier transforms are calculated at a range of frequencies, preferably corresponding to an expected range of frequency error (after correction by the frequency acquisition process). For one embodiment, the range of frequency error is ±190 Hz, and the four sequences of overall Fourier transforms are calculated every 30 Hz from −190 Hz to +190 Hz. The FATASD block 418 then determines 708 the Fourier power spectrum peak for each of the four sequences. The sequence that is found to have the largest power spectrum peak corresponds 710 to the symbol frequency, and the frequency at which the peak occurs is the error frequency. The error frequency preferably is used 712 to adjust the frequency generator 420 of the receiver in response to the error frequency. This adjustment advantageously can further improve receiver sensitivity for the duration of the message.

The reason for doing the sequences of overall Fourier transforms is based on the observation that in a noise free case $$X_k(f_i) = e^{-j(k-1)N2\pi f_e \Delta t} X_1(f_i)$$

where k stands for the column number, N is the number of samples in each piece, $f_e$ is the remaining frequency error, and $\Delta t$ is the sampling interval. In other words, it can be shown mathematically that the Fourier transforms calculated for the symbol fragments are related to one another as if they were frequency modulated by an amount proportional to the frequency error. When an overall Fourier transform is calculated from the eight complex values of a row of the matrix, the effect is to remove the error frequency modulation, thereby allowing an accurate measurement of the spectral energy to be made. Simulations have shown that this technique advantageously produces a more reliable symbol detection than averaging the eight complex values of each row, and a more reliable symbol detection than averaging the magnitudes of the eight complex values of each row.

While the above example is directed at four-level FSK, it will be appreciated that for M-ary FSK the FATASD block 418 calculates for the plurality of fragments a plurality of Fourier transforms at each of M symbol frequencies, and then determines the symbol to be the symbol corresponding to one of the M symbol frequencies whose corresponding plurality of overall Fourier transforms produced the peak value.

The demodulation technique described above can be equally well applied to demodulating a phase shift keying (PSK) signal, a quadrature amplitude modulation (QAM) signal and a wavelet modulated signal. For the PSK case, the FATASD block 418 calculates for the plurality of fragments a plurality of Fourier transforms at a single frequency, e.g. the carrier frequency, represented as a single row of complex values. Next, the FATASD block 418 computes from the plurality of complex values in the single row a single sequence of overall Fourier transforms across the error frequency range. Then the FATASD block 418 determines the symbol to be the symbol corresponding to the phase of the single sequence of overall Fourier transforms at a frequency corresponding to the peak value.

For the QAM case, the FATASD block 418 also calculates for the plurality of fragments a plurality of Fourier transforms at a single frequency, e.g. the carrier frequency, represented as a single row of complex values. Next, the FATASD block 418 computes from the plurality of complex values in the single row a single sequence of overall Fourier transforms across the error frequency range. Then the FATASD block 418 determines the symbol to be the symbol corresponding to the amplitude and phase of the single sequence of overall Fourier transforms at a frequency corresponding to the peak value.

For the case of M-ary wavelet modulation, the FATASD block 418 performs for the plurality of fragments a plurality of correlations with each of M possible wavelets, using well-known correlation techniques, thereby generating a matrix of M rows containing a plurality of complex values. Next, the FATASD block 418 computes from the plurality of complex values in the matrix M sequences of overall Fourier transforms across the error frequency range. Then the FATASD block 418 determines the symbol to be the symbol corresponding to one of the M possible wavelets whose corresponding plurality of overall Fourier transforms produce the largest peak value.

For the case of a frequency hopping or direct sequence spread spectrum system utilizing low speed (such as 200 bps) FSK, the techniques according to the present invention can be applied without any modification.

Preferably, the recursive DTFT calculation technique utilized in accordance with the present invention is similar to that described in application Ser. No. 08/646,804 filed May 21, 1996 by Chen, now U.S. Pat. No. 5,729,577 entitled "Signal Processor with Improved Efficiency." Edited portions of said application are included herein below.

Figure 8:
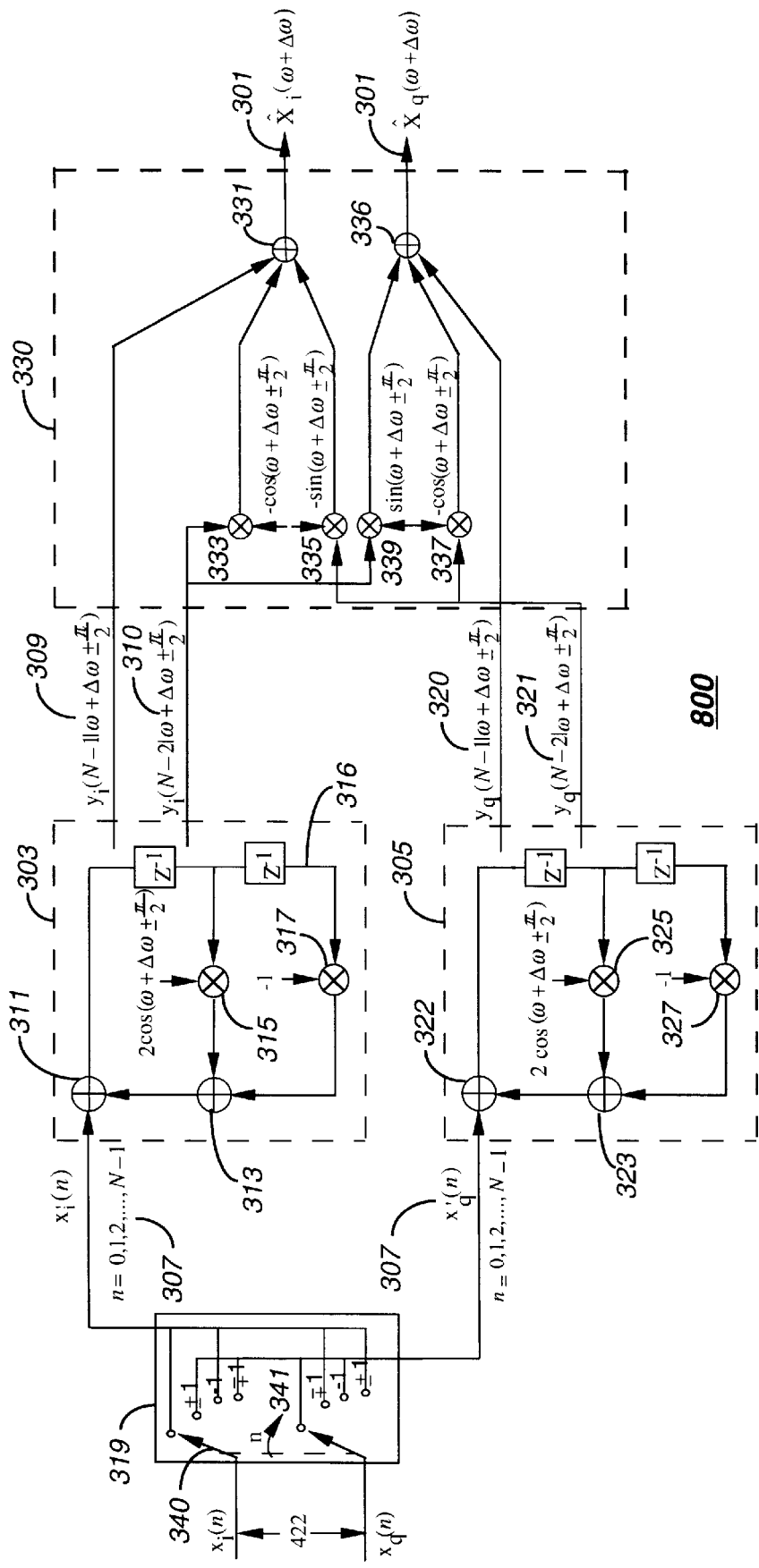
FIG. 8 is a block diagram of a signal analyzer for computing a discrete-time Fourier transform in accordance with the instant invention and suitable for use in the frequency domain receiver.

Referring to FIG. 8, a block diagram depicts a signal analyzer 800 for computing a discrete-time Fourier transform in accordance with the instant invention and suitable for use in the frequency domain receiver 400. The signal analyzer 800 is preferably implemented in the signal processor 410 executing software readily written by one of ordinary skill in the art, given the teachings of the instant disclosure. Generally FIG. 8 depicts in composite block diagram form 3 embodiments of a signal processor arranged and constructed to provide a discrete time Fourier transform (DTFT), at output 301, corresponding to a sequence of samples, $x'_i(n), x'_q(n)$ 307, n being the sample sequence index and varying from 0, 1, 2, . . . , to N−1, where N, from above, is the number of samples, preferably 50 or alternatively 25 for a symbol time period, including a current, preferably, last sample, $x'_i(N-1), x'_q(N-1)$, of a signal. The three embodiments are distinguished by the algebraic signs (plus (+) and minus (−)) where the preferred embodiment corresponds to the upper sign, a first alternative embodiment corresponds to the lower sign, and a second alternative embodiment substitutes 0 for the $\pi/2$ factors in the sinusoidal functions and $x_i(n)=x'_i(n), x_q(n)=x'_q(n)$ all as further explained.

Before continuing with the discussion of FIG. 8, some mathematical background information will be presented. Given a complex discrete time signal defined as:

$$x(n)=x_i(n)+jx_q(n), n=0,1,2,\ldots,N-1,$$

and the task of computing a DTFT at an arbitrary frequency, $\omega$, where the DTFT, $X(\omega)$, is defined as:

$$X(\omega) = \sum_{n=0}^{N-1} x(n)e^{-j\omega n},$$

it can be shown that;

$$X(\omega)=e^{-j(N-1)\omega}y(N-1|\omega)-e^{-jN\omega}y(N-2|\omega)),$$

where $$y(N-1|\omega)=y_i(N-1|\omega)+jy_q(N-1|\omega)$$

$$y(N-2|\omega)=y_i(N-2|\omega)+jy_q(N-2|\omega),$$

$$y_i(n|\omega)=2\cos\omega y_i(n-1|\omega)-y_i(n-2|\omega)+x_i(n)$$

$$y_q(n|\omega)=2\cos\omega y_q(n-1|\omega)-y_q(n-2|\omega)+x_q(n)$$

The signal analyzer 800 includes a recursive structure including a first recursive structure 303 and, when the signal is complex, a second recursive structure 305, that is coupled to the signal, specifically and respectively the sequence of samples $x'_i(n), x'_q(n)$. The recursive structure 303 operates on the real part of the sequence of samples 307 to provide an output 309 designated $y_i(N-1|\omega+\Delta\omega\pm\pi/2)$ and a first previous output 310 designated $y_i(N-2|\omega+\Delta\omega\pm\pi/2)$. The output is proportional, preferably equivalent, to a combination, such as an algebraic sum as provided by adders 311, 313, of the current and, preferably, last sample of the signal, $x'_i(N-1)$, and the first previous output 310 weighted at multiplier 315 by a sinusoidal function, less (indicated by multiplying by −1 at multiplier 317) a second previous output at 316.

Analogously the second recursive structure 305 operates on the imaginary part of the sequence of samples 307 to provide an output 320 designated $y_q(N-1|\omega+\Delta\omega\pm\pi/2)$ and a first previous output 321 designated $y_q(N-2|\omega+\Delta\omega\pm\pi/2)$. The output is proportional, preferably equivalent, to a combination, such as algebraic sum as provided by adders 322, 323, of the current and, preferably, last sample of the signal, $x'_q(N-1)$, and the first previous output 322 weighted at multiplier 325 by a sinusoidal function, less (indicated by multiplying by −1 at multiplier 327) a second previous output at 326.

The sinusoidal function is, in its simplest form preferably, $2\cos(\omega)$ and has an argument corresponding to an arbitrary frequency, $\omega=2\pi f/f_s$, where f is the arbitrary frequency and $f_s$ is the sampling frequency, preferably 20,000. This function becomes $2\cos(\omega\pm\pi/2)$ when a preferred form of a signal conditioner 319, later explained, is provided and enabled.

The sinusoidal function as depicted and preferred is $2\cos(\omega+\Delta\omega\pm\pi/2)$ when the frequency error, $\Delta\omega$, calculated and stored by the signal processor 410 is nonzero.

Further included in the signal analyzer 800 is a combiner 330 that is coupled to the output 309 and the first previous output 310 and when the signal is complex the output 320 and first previous output 321 for providing, at output 301, a DTFT signal, $\hat{X}_i(\omega+\Delta\omega)+j\hat{X}_q(\omega+\Delta\omega)$. This DTFT signal may be shown to be proportional, preferably same magnitude but phase shifted from a DTFT evaluated at the arbitrary frequency for the sequence of samples $x'_i(n), x'_q(n)$ 307.

More specifically an adder 331 combines the output 309 with the first previous output 310 multiplied, at multiplier 333, by $-\cos(\omega+\Delta\omega\pm\pi/2)$, and, when the sequence of samples is complex, the first previous output 321 multiplied, at multiplier 335, by $-\sin(\omega+\Delta\omega\pm\pi/2)$ to provide $\hat{X}_i(\omega+\Delta\omega)$. Similarly, $\hat{X}_q(\omega+\Delta\omega)$ is produced by adder 336 combining the output 320 with the first previous output 321 multiplied, at multiplier 337, by $-\cos(\omega+\Delta\omega\pm\pi/2)$, and the first previous output 310 multiplied or weighted, at multiplier 339, by $+\sin(\omega+\Delta\omega\pm\pi/2)$. From the algebraic signs it is clear that the adders very often are finding a difference between two inputs as weighted.

It should be noted that while it is preferable that the recursive structures operate on all N samples before the outputs and first previous outputs are combined to yield the DTFT signal the signal processor may provide completely satisfactory results if less than all N samples are used. For example, 40 or less of the 50 samples may well be sufficient to provide a reliable estimate of which of four different symbols is present in a given symbol time period, particularly under strong signal conditions.

The signal processor may additionally include a signal conditioner 319 that operates on the sampled digital data $x_i(n)$, $x_q(n)$ from the output 422 (sequential data sequence) to provide the sequence of samples 307 so as to limit the magnitude of the output 309, 320 and first previous outputs 310, 321. The signal conditioner 319, preferably, phase shifts each sample of an input signal, the sampled data signal, to provide the sequence of samples 307. Due to the recursive nature of the recursive structures 303, 305 intermediate results at the outputs such as output 309 may get quite large depending on the characteristics of the input data and more importantly the value of the argument for the sinusoidal function, specifically cosign function. In particular when this argument approaches either 0 or $\pi$ the cosine function approaches a value of ±1 and by observation the outputs, such as output 309 will tend to increase in size dramatically. When the dynamic range of the recursive structure is constrained such as when using a fixed point DSP implementation this may result in significant inaccuracies in the final DTFT signal.

This phase shift may be any amount but three particular cases each having certain advantageous attributes will be considered. If the magnitude of the normalized radian frequency, $\omega$, or more specifically corrected normalized radian frequency $\omega+\Delta\omega$ is not close to 0 or $\pi$, but rather lies within a range of approx. $0.25\pi$ to $0.75\pi$ then a phase shift of zero is typically acceptable. A phase shift of zero corresponds to not having the signal conditioner 319 or disabling it by insuring that a commutating switch 340 does not operate but rather directs each data sample $x_i(n), x_q(n)$ pair to the recursive structures without modification. This corresponds to the switch 340 staying in the position depicted.

It has been further discovered that a phase shift of $\pm\pi/2$ is particularly advantageous from a computational efficiency perspective. While preferably a positive $\pi/2$ shift is employed a negative $\pi/2$ shift works equally well, albeit is implemented differently as depicted by FIG. 8. In any event this phase shift amounts to multiplying each data sample by $e^{\pm jn\pi/2}$. Those of ordinary skill will recognize this is a computationally efficient transform of the data samples, reducing to a routing or algebraic sign change only.

For a positive $\pi/2$ shift and n=0, 1, 2, 3, 4, 5, . . . $x'_i(n)=x_i(0), -x_q(1), -x_i(2), x_q(3), x_i(4), -x_q(5), \ldots$ Similarly, $x'_q(n)=x_q(0), x_i(1), -x_q(2), -x_i(3), x_q(4), -x_i(5), \ldots$ For a negative $\pi/2$ shift $x'_i(n)=x_i(0), x_q(1), -x_i(2), -x_q(3), x_i(4), -x_q(5), \ldots$ and $x'_q(n)=x_q(0), -x_i(1), -x_q(2), x_i(3), x_q(4), -x_i(5), \ldots$ This corresponds to the commutating switch driven by the time index n cycling every four counts in the direction indicated by the arrow 341 where the algebraic sign for each branch of the switch is selected such that a positive $\pi/2$ shift corresponds to the upper sign, when two signs are provided, and a negative $\pi/2$ shift corresponds to the lower sign where two signs are given.

At this point it may be useful to review the operation of the signal analyzer 800. Generally a signal in sampled data form, $x_i(n)+jx_q(n)$, n=0, 1, 2, 3, . . . , N−1 is coupled to the signal conditioner 319. Suppose the DTFT magnitude of a signal having an arbitrary frequency f, such as nominally 2400 Hz, is required. The signal analyzer 800 adds this arbitrary frequency, specifically the normalized frequency, $2\pi\times2400/20000=0.24\pi$ to the frequency error $\Delta\omega$. Suppose, for example, this is 1000 Hz or normalized $0.1\pi$, for a total of 3400 Hz or $0.34\pi$.

Since this falls within the range of $0.25\pi$ to $0.75\pi$, the signal need not be conditioned, so the conditioner is disabled by the signal processor 410, and the signal is thus routed, sample by sample, directly to the recursive structures 303, 305. The sinusoidal functions or processing coefficients or constants, $\cos(0.34\pi)$ and $\sin(0.34\pi)$ (Note: there is no $\pi/2$ shift) are determined by calculation or lookup table to be 0.48175 and 0.87631 respectively. The recursive structures, preferably, process all N samples, here 50 samples, and after each sample including the $N^{th}$ sample, specifically $x_i(N-1)+jx_q(N-1)$, provides the outputs 309, 320 and the first previous outputs 310, 321. The combiner 330 combines as above explained these outputs and first previous outputs with one last sequence of multiplies and adds and provides the DTFT signal, $\hat{X}_i(\omega+\Delta\omega)+j\hat{X}_q(\omega+\Delta\omega)$.

This DTFT signal is proportional to a DTFT evaluated at the arbitrary frequency of 2400 Hz or after including the frequency error of 1000 Hz, 3400 Hz for this sequence of samples. The DTFT signal may be shown to be proportional in amplitude to a DTFT for this 3400 Hz signal component but may vary in phase from the true DTFT. This variation results from certain simplifications that have been taken advantage of in the combiner 330. These simplifications are applicable when the primary interest is a frequency dependent amplitude or power in a signal and the phase information is not required. In the preferred embodiment, the DTFT signal is coupled to the maximum DTFT block 412 where the real and imaginary components are squared and added to find the magnitude or power of the 3400 Hz signal, specifically the power corresponding to a 2400 Hz symbol.

For a symbol detector using this or a form of this signal processor and further including the magnitude detector operating to form a magnitude of the DTFT signal, the above process using the recursive structure and the combiner is repeated to form a second DTFT signal for a second frequency corresponding to a second symbol, such as −2400 Hz. The magnitude selector further forms a second magnitude of the second DTFT signal and selects the symbol corresponding to the larger of the two magnitudes. More specifically in the preferred embodiment having 4 different FSK symbols the above process is repeated for +800 Hz, −800 Hz. and −2400 Hz symbols after which a comparison of all magnitudes with one each corresponding to each possible symbol allows for one symbol to be selected, thus detected.

Figure 9:
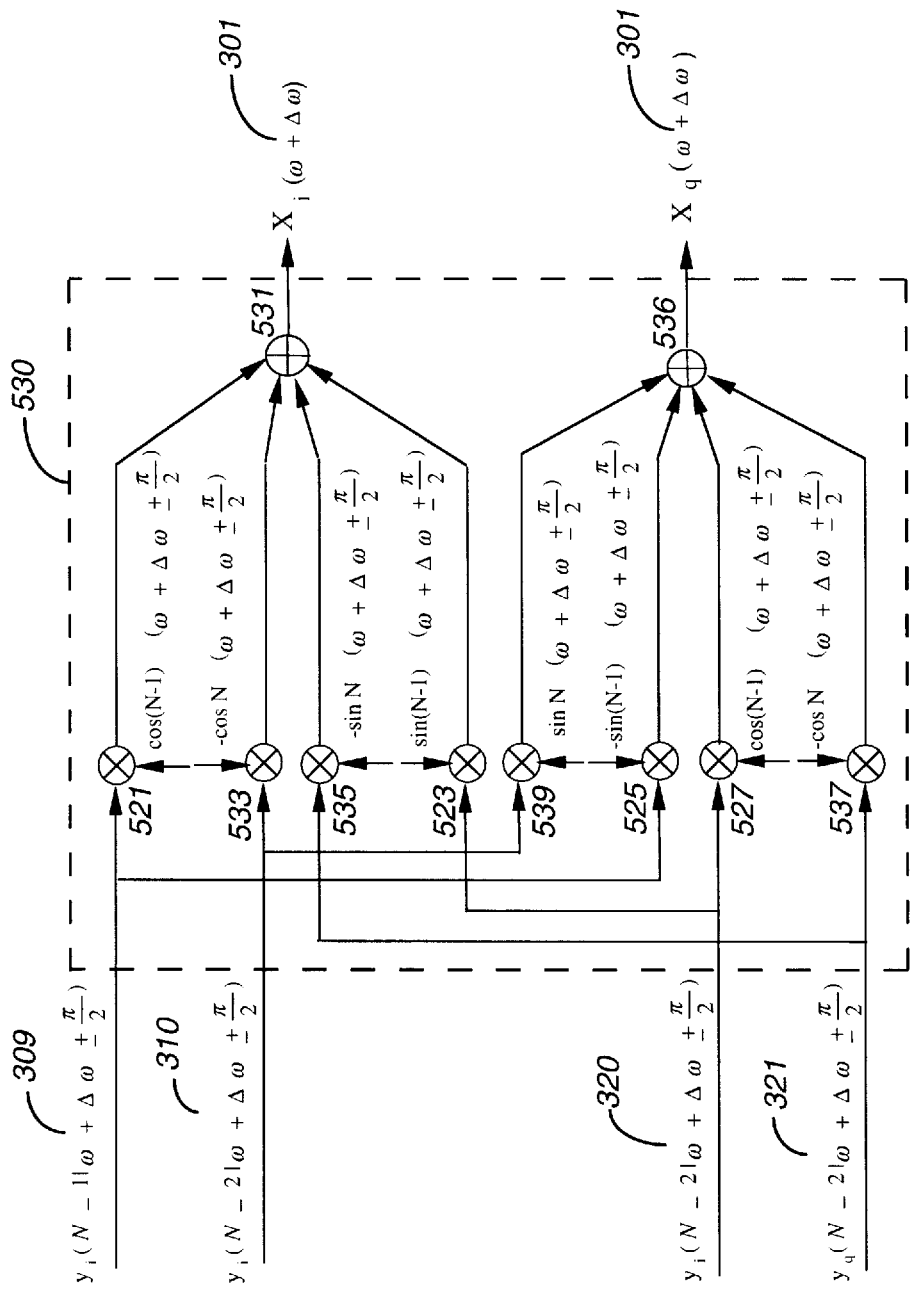
FIG. 9 is an alternative embodiment of a combiner in accordance with the present invention.

Referring to FIG. 9, an alternative embodiment of a combiner 530 is depicted. This combiner is suitable for use as a substitute for the combiner 330 and has like inputs, namely the outputs 309, 320 and the first previous outputs 310, 321. The combiner 530 however provides, at output 301, a DTFT signal, $X_i(\omega+\Delta\omega)+jX_q(\omega+\Delta\omega)$, that has accurate phase and magnitude information. This combiner 530 would be required and useful in PSK or QAM systems where symbol detection requires the phase information, specifically $\tan^{-1}[X_q(\omega+\Delta\omega)/X_i(\omega+\Delta\omega)]$. QAM systems ordinarily require both phase and magnitude, specifically $[X_i(\omega+\Delta\omega)^2+X_q(\omega+\Delta\omega)^2]^{1/2}$. Due to practical difficulties, specifically extensive calculations, most practitioners will try to use the squared magnitude when feasible.

More specifically an adder 531 combines the output 309 weighted or multiplied, at multiplier 521, by $\cos(N-1)(\omega+\omega\pm\pi/2)$ with the first previous output 310 multiplied, at multiplier 533, by $-\cos N(\omega+\omega\pm\pi/2)$, and, when the sequence of samples is complex, the output 320 multiplied, at multiplier 523, by $\sin(N-1)(\omega+\omega\pm\pi/2)$, along with the first previous output 321 multiplied, at multiplier 535, by $-\sin N(\omega+\omega\pm\pi/2)$, to provide $X_i(\omega+\Delta\omega)$, the real or in phase portion of the DTFT signal. Similarly, $X_q(\omega+\Delta\omega)$, the imaginary or quadrature portion of the DTFT signal, is produced by adder 536 combining the output 320 multiplied, at multiplier 527, by $\cos(N-1)(\omega+\omega\pm\pi/2)$ with the first previous output 321 multiplied, at multiplier 537, by $-\cos N(\omega+\Delta\omega\pm\pi/2)$, and the output 309 multiplied, at multiplier 525, by $-\sin(N-1)(\omega+\omega\pm\pi/2)$ along with the first previous output 310 multiplied or weighted, at multiplier 539, by $\sin N(\omega+\Delta\omega\pm\pi/2)$.

Thus it should be apparent by now that the present invention provides a method and apparatus for demodulating a symbol transmitted at low power and at a very low data rate. The method and apparatus advantageously maintain receiver sensitivity at or near the theoretical benchmark sensitivity even in the presence of significant symbol frequency error.

While the foregoing has disclosed by way of example an embodiment in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method in a receiver for demodulating a symbol, comprising the steps of:

receiving the symbol;

subdividing the symbol into a plurality of fragments;

performing for the plurality of fragments a plurality of correlations with at least one possible symbol value, thereby producing a plurality of complex values corresponding to each fragment and further corresponding to the at least one possible symbol value;

computing from the plurality of complex values a plurality of overall Fourier transforms across a frequency range;

locating a peak value in the plurality of overall Fourier transforms; and determining the symbol from the peak value.

2. The method of claim 1 further comprising the steps of:

determining an error frequency at which the peak value occurs; and adjusting a frequency generator of the receiver in response to the error frequency.

3. The method of claim 1, wherein the receiver is for demodulating M-ary frequency shift keying modulation, and wherein the performing step comprises the step of calculating for the plurality of fragments a plurality of Fourier transforms at each of M symbol frequencies, and wherein the determining step comprises the step of determining the symbol to be the symbol corresponding to one of the M symbol frequencies whose corresponding plurality of overall Fourier transforms produced the peak value.

4. The method of claim 1,
wherein the receiver is for demodulating phase shift keying modulation, and
wherein the performing step comprises the step of calculating for the plurality of fragments a plurality of Fourier transforms at a single frequency, and
wherein the determining step comprises the step of determining the symbol to be the symbol corresponding to a phase of the plurality of overall Fourier transforms at a frequency corresponding to the peak value.

5. The method of claim 1,
wherein the receiver is for demodulating quadrature amplitude modulation, and
wherein the performing step comprises the step of calculating for the plurality of fragments a plurality of Fourier transforms at a single frequency, and
wherein the determining step comprises the step of determining the symbol to be the symbol corresponding to an amplitude and phase of the plurality of overall Fourier transforms at a frequency corresponding to the peak value.

6. The method of claim 1,
wherein the receiver is for demodulating M-ary wavelet modulation, and
wherein the performing step comprises the step of performing for the plurality of fragments a plurality of correlations with each of M possible wavelets, and
wherein the determining step comprises the step of determining the symbol to be the symbol corresponding to one of the M possible wavelets whose corresponding plurality of overall Fourier transforms produce the peak value.

7. The method of claim 1, further comprising the steps of:
subdividing a received frequency acquisition segment into a plurality of portions;
calculating a plurality of Fourier power spectra for ones of the plurality of portions over a frequency range;
calculating a sum of the plurality of Fourier power spectra; and
locating a peak of the sum of the Fourier power spectra to determine a carrier frequency error.

8. An apparatus in a receiver for demodulating a symbol, the apparatus comprising:
signal processor means for demodulating the symbol, wherein the signal processor means is programmed to:
subdivide the symbol into a plurality of fragments;
perform for the plurality of fragments a plurality of correlations with at least one possible symbol value, thereby producing a plurality of complex values corresponding to each fragment and further corresponding to the at least one possible symbol value;
compute from the plurality of complex values a plurality of overall Fourier transforms across a frequency range;
locate a peak value in the plurality of overall Fourier transforms; and
determine the symbol from the peak value.

9. The apparatus of claim 8,
wherein the apparatus further comprises frequency generator means coupled to the signal processor means, and wherein the signal processor means is further programmed to:
determine an error frequency at which the peak value occurs; and
adjust the frequency generator means in response to the error frequency.

10. The apparatus of claim 8,
wherein the receiver is for demodulating M-ary frequency shift keying modulation, and
wherein the signal processor means is further programmed to:
calculate for the plurality of fragments a plurality of Fourier transforms at each of M symbol frequencies, and
determine the symbol to be the symbol corresponding to one of the M symbol frequencies whose corresponding plurality of overall Fourier transforms produced the peak value.

11. The apparatus of claim 8,
wherein the receiver is for demodulating phase shift keying modulation, and
wherein the signal processor means is further programmed to:
calculate for the plurality of fragments a plurality of Fourier transforms at a single frequency, and
determine the symbol to be the symbol corresponding to a phase of the plurality of overall Fourier transforms at a frequency corresponding to the peak value.

12. The apparatus of claim 8,
wherein the receiver is for demodulating quadrature amplitude modulation, and
wherein the signal processor means is further programmed to:
calculate for the plurality of fragments a plurality of Fourier transforms at a single frequency, and
determine the symbol to be the symbol corresponding to an amplitude and phase of the plurality of overall Fourier transforms at a frequency corresponding to the peak value.

13. The apparatus of claim 8,
wherein the receiver is for demodulating M-ary wavelet modulation, and
wherein the signal processor means is further programmed to:
perform for the plurality of fragments a plurality of correlations with each of M possible wavelets; and
determine the symbol to be the symbol corresponding to one of the M possible wavelets whose corresponding plurality of overall Fourier transforms produce the peak value.

14. The apparatus of claim 8, wherein the signal processor means is further programmed to:
subdivide a received frequency acquisition segment into a plurality of portions;
calculate a plurality of Fourier power spectra for ones of the plurality of portions over a frequency range;
calculate a sum of the plurality of Fourier power spectra; and
locate a peak of the sum of the Fourier power spectra to determine a carrier frequency error.

15. A receiver for demodulating a symbol, the receiver comprising:
a receiver element for receiving the symbol; and
a signal processor for demodulating the symbol, wherein the signal processor is programmed to:

subdivide the symbol into a plurality of fragments;

perform for the plurality of fragments a plurality of correlations with at least one possible symbol value, thereby producing a plurality of complex values corresponding to each fragment and further corresponding to the at least one possible symbol value;

compute from the plurality of complex values a plurality of overall Fourier transforms across a frequency range;

locate a peak value in the plurality of overall Fourier transforms; and determine the symbol from the peak value.

16. The receiver of claim 15, wherein the receiver further comprises a frequency generator, and wherein the signal processor is further programmed to:

determine an error frequency at which the peak value occurs; and adjust the frequency generator in response to the error frequency.

17. The receiver of claim 15, wherein the receiver is for demodulating M-ary frequency shift keying modulation, and wherein the signal processor is further programmed to:
calculate for the plurality of fragments a plurality of Fourier transforms at each of M symbol frequencies, and
determine the symbol to be the symbol corresponding to one of the M symbol frequencies whose corresponding plurality of overall Fourier transforms produced the peak value.

18. The receiver of claim 15, wherein the receiver is for demodulating phase shift keying modulation, and wherein the signal processor is further programmed to:
calculate for the plurality of fragments a plurality of Fourier transforms at a single frequency, and
determine the symbol to be the symbol corresponding to a phase of the plurality of overall Fourier transforms at a frequency corresponding to the peak value.

19. The receiver of claim 15, wherein the receiver is for demodulating quadrature amplitude modulation, and wherein the signal processor is further programmed to:
calculate for the plurality of fragments a plurality of Fourier transforms at a single frequency, and
determine the symbol to be the symbol corresponding to an amplitude and phase of the plurality of overall Fourier transforms at a frequency corresponding to the peak value.

20. The receiver of claim 15, wherein the receiver is for demodulating M-ary wavelet modulation, and wherein the signal processor is further programmed to:
perform for the plurality of fragments a plurality of correlations with each of M possible wavelets; and
determine the symbol to be the symbol corresponding to one of the M possible wavelets whose corresponding plurality of overall Fourier transforms produce the peak value.

21. The receiver of claim 15, wherein the signal processor is further programmed to:

subdivide a received frequency acquisition segment into a plurality of portions;

calculate a plurality of Fourier power spectra for ones of the plurality of portions over a frequency range;

calculate a sum of the plurality of Fourier power spectra; and locate a peak of the sum of the Fourier power spectra to determine a carrier frequency error.

* * * * *